Patented Jan. 12, 1943

2,307,843

UNITED STATES PATENT OFFICE 2,307,843

PREPARATION OF RESINS FOR PLUGGING FORMATIONS

Clyde H. Mathis and Carl Rampacek, Bartlesville, Okla., assignors to Phillips Petroleum Company, a corporation of Delaware No Drawing. Application May 16, 1940, Serial No. 335,628

4 Claims. (Cl. 166—22)

This invention relates to a process of preparing resinous materials for plugging formations. More particularly, the invention relates to an improvement in the process of preparation of resinous materials for plugging of openings in tanks, walls, dams, etc., for plugging formations, particularly those encountered in oil and gas wells, and the coating of surfaces. This invention is an improvement over that described in a co-pending application, Serial No. 200,766, by Lerch, Mathis and Gatchell.

The above-mentioned co-pending application describes the preparation and use of a liquid material which, after in place, will undergo condensation, association, polymerization or other chemical reactions to form a resin that will prevent the flow of water, oil and/or gas from or into the formations into which the resinous material has been injected, and generally serve as a sealing agent against flow into or out of tanks, walls, dams and/or from or through any surface whatsoever.

In the drilling of oil and gas wells, water formations are usually encountered during drilling and before the productive oil or gas horizon is contacted. It is required to run steel casing into the well to shut off these water formations but in many instances these waters are corrosive and in contacting the steel casing will soon corrode the same, allowing encroachment of water into the well. Also after an oil or gas well is completed, bottom hole water may be entering the well hole bore from the producing formation. This water must be removed from the well bore along with the oil or gas and materially increases the lifting costs to get the oil to the surface of the ground. In addition, the water in the well bore reduces the amount of oil which can be produced and further increases the treating cost of the oil when it reaches the surface of the ground since the water must be removed from the oil before the latter can be processed.

It is an object of this invention to introduce a liquid resin-forming material into the formation to be plugged in such a manner that the resin by condensation, association, polymerization or other chemical reaction will be formed thereby plugging the channels in the water bearing formation and preventing water from coming into contact with the casing when it is run into the well or entirely eliminating the need for running casing by plugging a water bearing formation.

Another object of this invention is to provide a process for sealing tank bottoms, walls, dam faces, etc., by placing a liquid resin-forming material on the surface in such manner that the resin by condensation, association, polymerization or other chemical reaction will be formed thereon.

A still further object of this invention is to provide a liquid resin-forming material, employing an acid catalyst, and neutralizing the excess acidity so that the resin forming mixture will not be corrosive to limestone or dolomite formations and liberate carbon dioxide gas therefrom.

Other objects and advantages will appear to those skilled in the art from a careful study of the following description.

*Example I*

A typical resin-forming material of this type can be made from 100 parts by weight of water, 100 parts by weight of thiourea and 197 parts by weight of furfural. These ingredients in the proportions given are well mixed and heated slightly, if necessary, to obtain a homogeneous solution. Hydrochloric acid is then added in the amount of 14 parts by weight of 100 per cent hydrochloric acid and the batch is stirred for a short period of time, 20 to 30 minutes is our usual mixing time, but we do not wish to be limited to this length of time, maintaining the temperature between 80–110° F., using artificial cooling is necessary. In case the temperature of the liquid during stirring rises above 110° F., the quality of the finished resin may be modified.

The amount of acid catalyst may be varied depending on the desired setting time and in practice it is convenient to use commercial 18° Baumé (29 per cent acid by weight) hydrochloric acid. Other catalysts have been tried with varying degrees of success. Favorable results have been obtained with free chlorine, certain metallic chlorides such as stannic chloride or ferric chloride, and the hydrochloride of certain organic compounds, as for example aniline hydrochloride. Less favorable results have been obtained with other mineral and organic acids such as sulfuric, phosphoric and oxalic acids. When hydrochloric acid is used as catalyst, the finished resin mix contains an excess of acid and is very reactive on limestone or dolomite. It has been noticed that due to the reaction on limestone and the resulting evolution of carbon dioxide gas, the proper setting of the resin may be retarded or even prevented entirely. In some cases the bubbles of gas become entrapped in the resin mixture and may reduce its specific gravity to a point at which the resin will rise through the column of brine or water in the bore hole.

In order to produce a finished non-acid resin mixture which will be non-reactive to limestone, we have discovered that the reation may be catalyzed with calcium hypochlorite. This compound hydrolyzes to form calcium hydroxide and hypochlorous acid and will catalyze the reaction giving a non-reactive (to limestone) resin mixture. It has been noticed that, when calcium hypochlorite is used as a catalyst, there is a separation of the liquid resin-forming mixture into two layers. The water layer contains approximately 7 per cent thiourea and inorganic products of the reaction, such as calcium chloride, and is specifically heavier than the resin layer. The upper layer represents the resin, which may be separated from the lower or water layer. This resin-forming liquid forms a very hard and impermeable solid.

In order to avoid the potential danger of reacting calcium hypochlorite with organic materials the regular hydrochloric acid catalyzed resin was used. When this resin-forming mixture was partially neutralized with a solution of sodium hydroxide, the above-mentioned phenomenon of the separation into layers was observed, the resulting resin having been found to possess excellent characteristics and quality. It has been found by experiment that better resins are obtained by controlling the pH value of the separated water layer by additions of caustic soda or other caustic to the resin-forming liquid mixture. The optimum pH value lies between 5.5 and 6.5; below a pH of 5.5 the mixture is liable to be reactive to limestone while above a pH of 6.5 the setting time is extended over a period considered too long to be practical.

*Example II*

After the acid catalyzed resin-forming product described in Example I has stood 20 to 30 minutes, the excess acid is neutralized by the addition of 36 parts of a 30 per cent sodium hydroxide solution. This resin mixture is stirred until the sodium hydroxide is completely mixed therewith and the excess free acid has been consumed or neutralized. The mixture is allowed to stand until the water (pH approximately 6.0) and the resin have become separated into two distinct layers, the resin being specifically heavier than the water solution layer. The lower or resin layer is a product which will solidify about 45 minutes at 150° F., in 6 hours at 110° F., or in 2 days at 80° F.

The above-mentioned 30 per cent sodium hydroxide solution was used for the neutralization because of convenience and optimum conditions, a more dilute caustic solution adds an excess of water to the system while a more concentrated caustic solution liberates excessive heat often resulting in modified resins.

The application of the material to the well bore can be directly by the casing, tubing, bailer, or by any conventional method suitable for lowering the liquid into the well. If necessary, pressure may be applied through the tubing by positive pump action after a well packer has been set between the tubing and casing above the formation where treatment is desired. After sufficient resin-forming material has been added to the formation, a plug of suitable material may be used to separate the resin-forming material from the oil or water which will follow in the tubing to drive the resin-forming material out into the formation to be plugged and thus insure that the resin-forming material will not set up in the tubing. The pressure will be held on the formation until the liquid material has had sufficient time to form a solid impermeable resin, plugging the formation.

This disclosure describes an improvement in the process for manufacturing synthetic resins containing acid catalysts whereby, after the action has proceeded for a sufficient length of time, the excess of free acid catalyst is neutralized with an alkali to render the resulting mixture substantially free of acid (pH of 5.5 to 6.5). The relative proportions of resin-forming ingredients, namely, the thiourea and the furfural, and even the water, may be varied within wide limits without seriously affecting the utility of the process. The amounts of these materials disclosed herein were selected for optimum conditions. While our invention relates specifically to the resin mixtures designed for plugging underground formations, we do not wish to limit it to this type of resin but include the general field of resins wherein an acid catalyst is used and the excess of free acid may be objectionable.

We claim:

1. A method of plugging formations with a liquid resin forming mixture comprising preparing said mixture of water, thiourea and furfural and allowing the mixture to undergo partial condensation in the presence of a hydrochloric acid catalyst, then adding an alkali to the mixture to reduce the acidity of the mixture to a pH approximately between the limits 5.5 to 6.5, and applying the final mixture in the liquid state to the formation to be plugged, when further condensation to a solid resin will occur.

2. A method of plugging formations in wells with a liquid resin-forming mixture comprising preparing a mixture of water, thiourea and furfural and allowing the mixture to undergo partial condensation in the presence of a hydrochloric acid catalyst, adding an alkali to the mixture, allowing the mixture to separate into a resin-forming material and an aqueous material and controlling the addition of the alkali so that the resulting acidity of the said aqueous material is between the limits of approximately pH 5.5 to pH 6.5 and applying while still in the liquid state the resin-forming mixture to the formation in the well to be plugged when further condensation to a solid resin will occur.

3. A method of plugging formations in wells with a liquid resin-forming mixture comprising preparing a mixture of water, thiourea and furfural and allowing the mixture to undergo partial condensation in the presence of a hydrochloric acid catalyst for 20 to 30 minutes, adding an alkali to the mixture, allowing the mixture to separate into a lower resin-forming layer and an upper aqueous layer and controlling the time of set of the resin by controlling the amount of hydrochloric acid catalyst used and the amount of alkali added so that the acidity of the upper aqueous layer after the addition of the alkali is between the limits of pH 5.5 to pH 6.5, and applying while still in the liquid state the resin-forming layer to the formation in the well to be plugged when further condensation to a solid resin will occur.

4. A method of plugging formations in wells with a liquid resin-forming mixture comprising preparing a mixture of water, thiourea and furfural and allowing the mixture to undergo partial condensation in the presence of a hydrochloric acid catalyst for 20 to 30 minutes, adding sodium hydroxide to the mixture, allowing the mixture to separate into a lower resin-forming layer and an upper aqueous layer and controlling the time of set of the resin by controlling the amount of hydrochloric acid catalyst used and the amount of sodium hydroxide added so that the acidity of the upper aqueous layer after the addition of the alkali is between the limits of pH 5.5 to pH 6.5, and applying while still in the liquid state the lower resin-forming layer to the formation in the well to be plugged when further condensation to a solid resin will occur.

CLYDE H. MATHIS.
CARL RAMPACEK.